United States Patent
Gahlot et al.

(10) Patent No.: US 11,086,994 B2
(45) Date of Patent: Aug. 10, 2021

(54) PRIORITY SCANNING OF FILES WRITTEN BY MALICIOUS USERS IN A DATA STORAGE SYSTEM

(71) Applicant: EMC IP Holding Company LLC, Hopkinton, MA (US)

(72) Inventors: Jai Prakash Gahlot, Pune (IN); Amit Kumar Chauhan, Pune (IN); Shiv Shankar Kumar, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 369 days.

(21) Appl. No.: 16/225,878

(22) Filed: Dec. 19, 2018

(65) Prior Publication Data

US 2020/0201994 A1  Jun. 25, 2020

(51) Int. Cl.
| G06F 21/56 | (2013.01) |
| G06F 21/57 | (2013.01) |
| G06F 16/182 | (2019.01) |
| G06F 16/17 | (2019.01) |

(52) U.S. Cl.
CPC ........ *G06F 21/565* (2013.01); *G06F 16/1734* (2019.01); *G06F 16/1824* (2019.01); *G06F 21/577* (2013.01)

(58) Field of Classification Search
CPC ...... G06F 21/56; G06F 21/562; G06F 21/563; G06F 21/564; G06F 21/565; G06F 21/566; G06F 21/57; G06F 21/577; G06F 16/1734; G06F 16/1824; G06F 16/28; G06F 16/285; H04L 63/1425; H04L 63/1433; H04L 63/20
See application file for complete search history.

(56) References Cited

U.S. PATENT DOCUMENTS

| 2009/0044024 | A1* | 2/2009 | Oberheide | G06F 21/562 713/188 |
| 2009/0282476 | A1* | 11/2009 | Nachenberg | G06F 21/577 726/22 |
| 2012/0079596 | A1* | 3/2012 | Thomas | G06F 21/566 726/24 |
| 2016/0269422 | A1* | 9/2016 | McDougal | H04L 63/145 |
| 2016/0294847 | A1* | 10/2016 | Coronado | G06F 16/23 |
| 2016/0366167 | A1* | 12/2016 | Yumer | H04L 63/1425 |

* cited by examiner

*Primary Examiner* — Jung W Kim
*Assistant Examiner* — Adrian Stoica
(74) *Attorney, Agent, or Firm* — Amin, Turocy & Watson, LLP

(57) ABSTRACT

Priority scanning of files written by malicious users in a data storage system is described herein. A data storage system as described herein can include a user lookup component that obtains identities of users that have made at least one modification to a first file stored on the data storage system, resulting in a set of modifying users; a comparison component that compares respective modifying users of the set of modifying users to respective malicious users of a set of malicious users; and a scan priority component that, in response to the comparison component identifying at least one match between a modifying user of the set of modifying users and a malicious user of the set of malicious users, assigns a first scan priority to the first file that is higher than a second scan priority assigned to a second, different file stored on the data storage system.

20 Claims, 9 Drawing Sheets

PRIORITY SCANNING OF FILES WRITTEN BY MALICIOUS USERS IN A DATA STORAGE SYSTEM

TECHNICAL FIELD

The subject application is related to data storage systems, and more particularly, to techniques for managing security of a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms or systems, provide the means by which these large sets of data can be maintained in an efficient and reliable way. To facilitate system efficiency and scalability, an NAS system can utilize a distributed system in which storage and/or computing resources are distributed among multiple computing nodes, which in turn can be arranged into computing clusters. Additionally, an NAS system can be designed as a single-space storage solution, in which data are stored on the platform via a single volume and a single file system, thereby granting a client connected to any computing node of the platform the ability to access all data stored on the platform.

NAS systems can operation in combination with antivirus servers (AVSs) and/or other anti-malware servers in order to prevent malware-infected files from entering or residing on the platform. For instance, files stored on and/or accessed by an NAS system can be scanned for viruses or other malware by AVSs that are external to the data storage system and/or by other entities. Since an NAS system can provide a shared storage space for numerous users, the security of an NAS system can be adversely impacted by one or more users that attempt to place malware onto the system. A malicious user may do this intentionally to infect the system, or alternatively an innocent user may do this unknowingly by, e.g., writing files into the system that have been copied from an infected storage source. In some cases, the presence of multiple infected files that were created or modified by the same user can suggest that the same user may attempt to place more infected files on the system in the future.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a user lookup component that obtains identities of users that have made at least one modification to a first file stored on the data storage system, resulting in a set of modifying users, a comparison component that compares respective modifying users of the set of modifying users to respective malicious users of a set of malicious users, and a scan priority component that, in response to the comparison component identifying at least one match between a modifying user of the set of modifying users and a malicious user of the set of malicious users, assigns a first scan priority to the first file that is higher than a second scan priority assigned to a second file stored on the data storage system that is different than the first file.

In another aspect, a method is described herein. The method can include obtaining, by a device operatively coupled to a processor, user identities that are associated with having made at least one modification to a first file stored on the data storage system, resulting in a group of modifying user identities; comparing, by the device, respective modifying user identities of the group of modifying user identities to respective malicious user identities of a group of malicious user identities; and, in response to identifying at least one match between a modifying user identity of the group of modifying user identities and a malicious user identity of the group of malicious user identities, assigning, by the device, a first scan priority to the first file that is higher than a second scan priority assigned to a second file stored on the data storage system that is different than the first file.

In an additional aspect, a machine-readable medium including computer executable instructions is described herein. The instructions, when executed by a processor of a data storage system, can facilitate performance of operations including obtaining identities of users that have made at least one modification to a first file stored on the data storage system, resulting in modifying users, comparing respective modifying users of the modifying users to respective malicious users of malicious users, and in response to identifying at least one match between a modifying user of the modifying users and a malicious user of the malicious users, assigning a first scan priority to the first file that is higher than a second scan priority assigned to a second file stored on the data storage system that is different than the first file.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
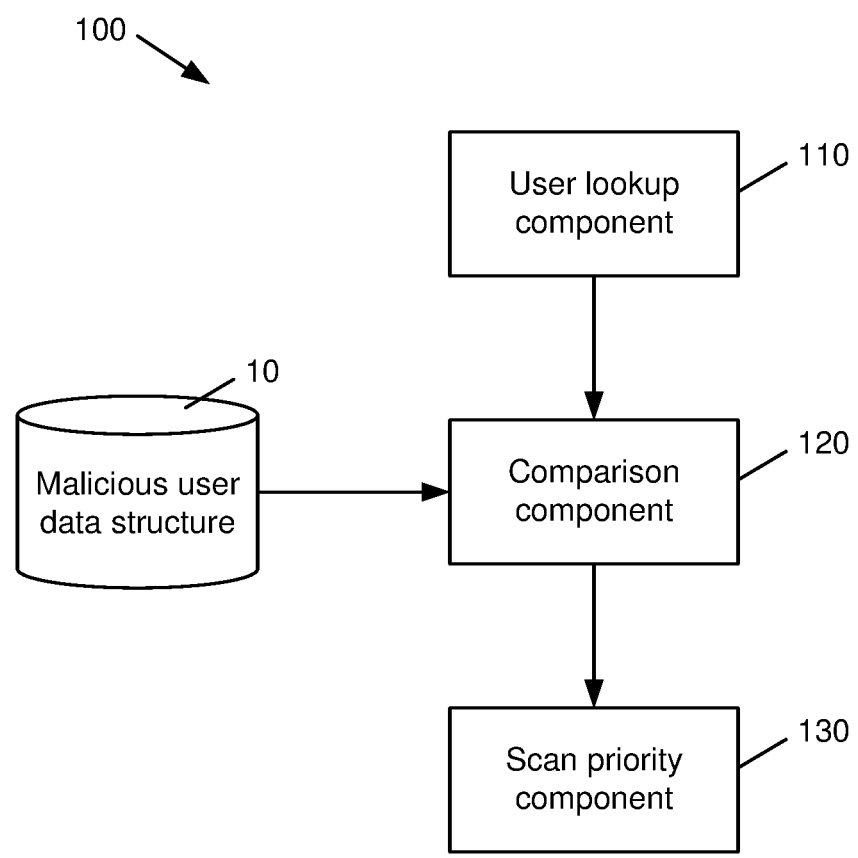
FIG. 1 is a block diagram of a system that facilitates priority scanning of files written by malicious users in a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. To facilitate management of and access to large-scale data sets, an NAS platform can utilize a distributed computing system that includes multiple computing devices (nodes) that are physically and/or logically connected into clusters. Respective nodes in a NAS cluster can further be configured such that each node enables access (e.g., by a client) to all data stored on the platform.

The distributed nature of NAS systems can enable such system to be highly scalable, thereby providing a shared storage space for potentially large numbers of users. However, as the number of users of an NAS system increases, the possibility for one or more malicious users intentionally or unintentionally attempting to inject malware onto the system storage also increases. For instance, a malicious user may inject malware intentionally to infect the system, or an innocent user may do so unknowingly, e.g., by writing files which have been copied from an infected storage source onto the system.

When a virus or other malware is detected in an NAS system, spread of the malware can be stopped by, e.g., deleting, truncating, or quarantining the infected file, blocking access to the infected file by system users, and/or by other means. In addition to these actions, various aspects herein provide techniques by which an NAS system can perform stricter malware scans on files written by a malicious and/or otherwise suspicious user based on the result of a previous virus scan.

Various aspects described herein relate to techniques by which an NAS system can prioritize malware scans of files written by malicious users who have written one or more infected files to the system previously. This can, in turn, aid the system in limiting the damage done by such users and protect the integrity of the system.

By prioritizing malware scanning for files written or modified by malicious or suspicious users, an NAS system can be better protected from further possible damage or infection caused by malicious users. For instance, in a system that utilizes scheduled malware scanning, various techniques provided herein can reduce the amount of time that malware can reside on the storage until the scheduled scan is triggered, thereby reducing the operable window where the malicious user(s) have write permissions to continue injecting malware onto the system.

Various aspects as described below can provide advantages that can improve the performance of an NAS system and/or its associated computing devices. These advantages can include, but are not limited to, the following. Security of an NAS system and/or information stored on the system can be made more secure by identifying files that are more likely to be infected with malware and prioritizing scanning of those files. Actions can be performed with respect to malware infections and/or malicious users based on automated processes using system data on a scale that could not be analyzed by a human in a useful or reasonable timeframe. System resource usage (e.g., in terms of network bandwidth, power consumption, processing cycles, etc.) associated with malware scanning and/or associated damage control can be reduced. Security and integrity of files or other data stored on an NAS system can be improved. Other advantages could also be realized.

With reference now to the drawings, FIG. 1 illustrates a system 100 that facilitates priority scanning of files written by malicious users in a data storage system in accordance with various aspects described herein.

As shown in FIG. 1, system 100 includes a user lookup component 110 that can obtain identities (e.g., numerical user identifiers or IDs, system usernames or handles, etc.) of users that have made at least one modification to a file stored on an NAS system and/or another suitable data storage system. As used herein, the term "modification" refers to any action taken by a user that results in a change to the information stored by the data storage system. This can include, e.g., creating (writing, copying, etc.) a file, editing a file, deleting a file, and/or any other suitable action(s). In an aspect, the user lookup component 110 can compile and/or otherwise direct the generation of a set of modifying users for respective stored files. Techniques for generating a set of recorded users for a given file are described in more detail below with respect to FIG. 2.

System 100 as shown in FIG. 1 further includes a comparison component 120 that can compare respective modifying users from the set of modifying users compiled by the user lookup component 110 to a set of malicious users. As used herein, the term "malicious user" refers to a user that has injected malware onto the data storage system at one or more times in the past. It should be appreciated that, unless stated otherwise, the term "malicious user" as used herein is intended to refer to users associated with both intentional and unintentional malware injection.

In an aspect, the set of malicious users associated with a data storage system can be associated with a malicious user data structure 10. In an aspect, the malicious user data structure 10 can be a table, a database, a list or linked list, a tree structure, and/or any other data structure that stores information relating to respective users that have written and/or otherwise injected viruses or other malware onto the data storage system at one or more times in the past. The malicious user data structure 10 can contain information that identifies respective malicious users associated with the system, such as a numerical user ID, a username or handle, and/or other suitable information. In addition, the malicious user data structure 10 can in some embodiments store malware counts and/or other information that indicates a number of times a user in the malicious user data structure 10 has injected malware onto the data storage system. In an aspect, this information can be utilized to identify malicious users associated with the system as well as to aid in preventing damage to the system from potential future malware infections. In another aspect, the malicious user data structure 10 can be maintained manually, e.g., by a system administrator, or it can be generated and/or updated via one or more automated processes.

As further shown by FIG. 1, system 100 includes a scan priority component 130 that prioritizes malware scanning of files modified and/or otherwise accessed by malicious users over other files stored in the data storage system. Stated another way, in response to the comparison component 120 identifying a match between a user that has modified a first file as identified by the user lookup component 110 and a malicious user, e.g., in the malicious user data structure 10, the scan priority component can assign a scan priority to the first file that is higher than that of another, second file.

Figure 2:
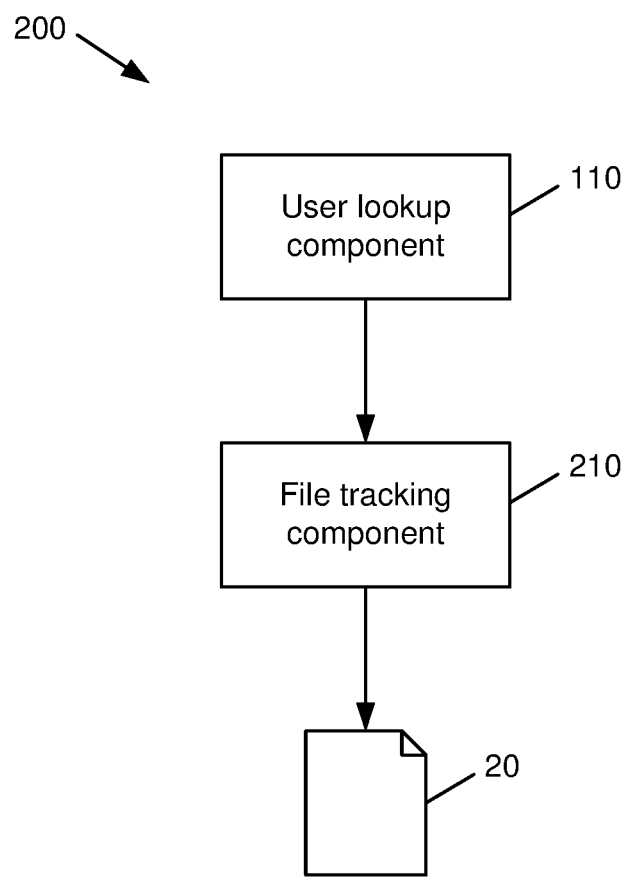
FIG. 2 is a block diagram of a system that facilitates tracking modifications to a file in a data storage system in accordance with various aspects described herein.

Turning next to FIG. 2, a block diagram of a system 200 that facilitates tracking modifications to a file in a data storage system in accordance with various aspects described herein is illustrated. Repetitive description of like elements employed in other embodiments described herein is omitted for brevity. As shown in FIG. 2, system 200 includes a user lookup component 110 that can operate in a similar manner as that described with respect to FIG. 1. In addition, system 200 as shown in FIG. 2 includes a file tracking component 210 that can record the set of modifying users for a file 20 as identified by the user lookup component 110. In an aspect, the file tracking component 210 can maintain the set of modifying users for the file 20 within the file 20 itself, e.g., in an attribute of the file 20. For instance, attribute data associated with the file 20 can be extended to include an owner field. For the purposes of this description, the term "owner" is used only to refer to a client or other user that makes modifications to the file 20 and is not intended to represent or imply other properties, such as read/write permissions or the like.

In an aspect, the set of modifying users for a file 20 as maintained by the file tracking component 210 can be a set of users that has modified the file 20 since its last malware scan. Thus, in response to completion of a malware scan of the file 20, the file tracking component 210 can clear the set of modifying users for the file 20. The file tracking component 210 can clear the set of modifying users for the file 20 conditionally. For instance, the file tracking component 210 can clear the set of modifying users for a file 20 in response to a malware scan of the file 20 indicating that the file 20 does not contain malware. If the malware scan of the file 20 indicates that the file 20 does contain malware, the set of modifying users for the file 20 can be left intact by the file tracking component 210, e.g., pending quarantine of the file 20 and/or other damage control actions taken with respect to the file 20 and/or its modifying users. Techniques for managing a list of modifying users for a file 20 in response to malware scan results are described in further detail with respect to FIG. 4.

Figure 3:
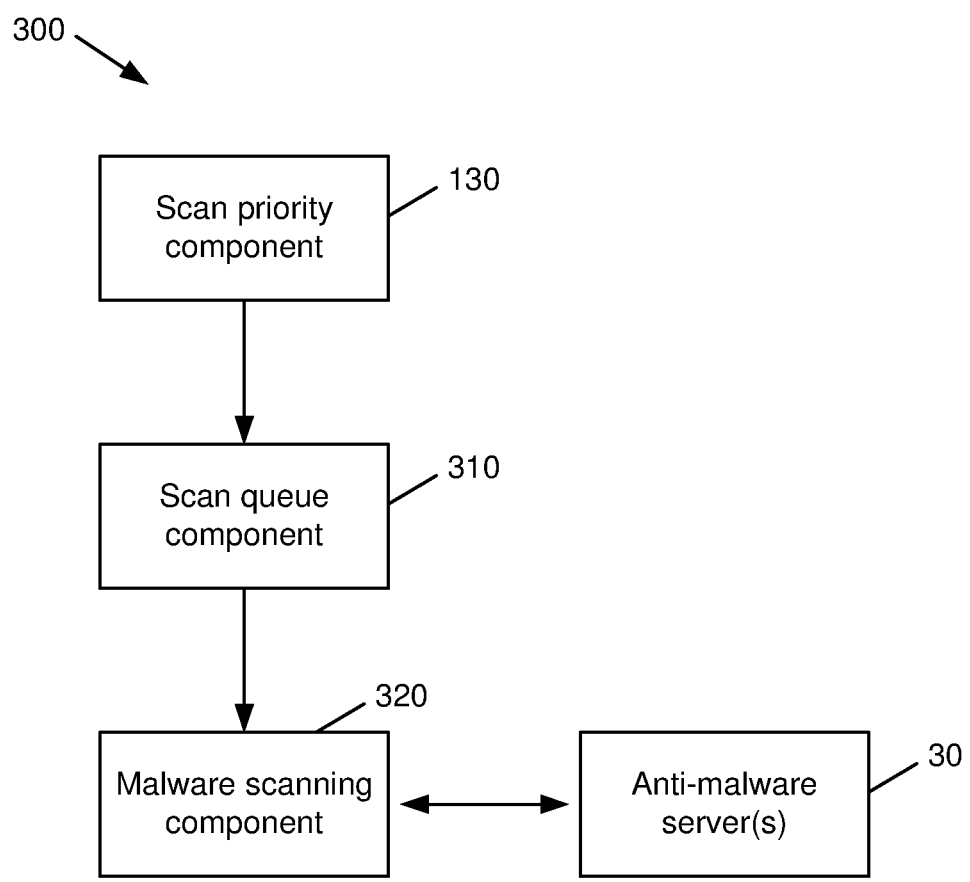
FIG. 3 is a block diagram of a system that facilitates managing a malware scan queue in accordance with various aspects described herein.

Turning next to FIG. 3, a block diagram of a system 300 that facilitates managing a malware scan queue in accordance with various aspects described herein is illustrated. Repetitive description of like elements employed in other embodiments described herein is omitted for brevity. System 300 as shown by FIG. 3 includes a scan priority component 130 that can prioritize scanning of files associated with malicious users according to various aspects as described above.

In an aspect, the scan priority component 130 can prioritize respective stored files for scanning with the aid of a scan queue component 310, which can generate a malware scan queue that includes respective stored files, such as first files that are associated with one or more malicious users and second files that are not associated with malicious users. System 300 further includes a malware scanning component 320 which can, in turn, direct respective malware scans of the files queued by the scan queue component 310 in an order defined by the malware scan queue.

In an aspect, the malware scanning component 320 can itself scan the files given by the malware scan queue, or alternatively it can direct an external entity, such as an external antivirus server (AVS) or other anti-malware server 30 to perform the appropriate scans.

In another aspect, the scan priority component 130 can direct the order in which files are positioned within the scan queue by the scan queue component 310 based on respective identities of users that have modified the files, as generally described above with respect to FIG. 1. For instance, in response to the comparison component 120 shown in system 100 identifying a match between a user that has modified a given file and a malicious user given by the malicious user data structure 10, the scan priority component 130, via the scan queue component 310, can move that file ahead of other files in the scan queue that have not been modified by a malicious user since their respective last scans.

Also or alternatively, the scan priority component 130, via the malware scanning component 320, can direct a real-time or substantially real-time malware scan of a file in response to determining that the file has been modified by a malicious user, thereby bypassing the scan queue defined by the scan queue component 310 for that file. In the event that a file is scanned in this manner, the scan queue component 310 can remove the file from the malware scan queue in response to completion of its malware scan. This can be used in cases where, e.g., the scan queue is associated with a scheduled scan priority and one or more files modified by malicious users are desirably scanned with a real time scan priority to reduce the time window in which said files remain on the system without being scanned.

In an aspect, whether a file modified by a malicious user is moved ahead in the scan queue or scanned in substantially real time without reference to the scan queue can depend on the amount and/or extent of malicious user interactions with the file. For instance, a tiered queuing system can be used wherein files modified by multiple different users, or the same malicious user multiple times, can be prioritized ahead of other files modified by a single malicious user in the queue and/or scanned in real time outside of the queue as described above. In another example, the malicious user data structure 10 can contain information relating to the number of malware injections associated with a particular malicious user, and files modified by a malicious user with a malware injection count that is higher than a given threshold can be given higher priority over those modified by a malicious user with a malware injection count under the threshold. Other techniques for prioritizing files for scanning could also be used.

Figure 4:
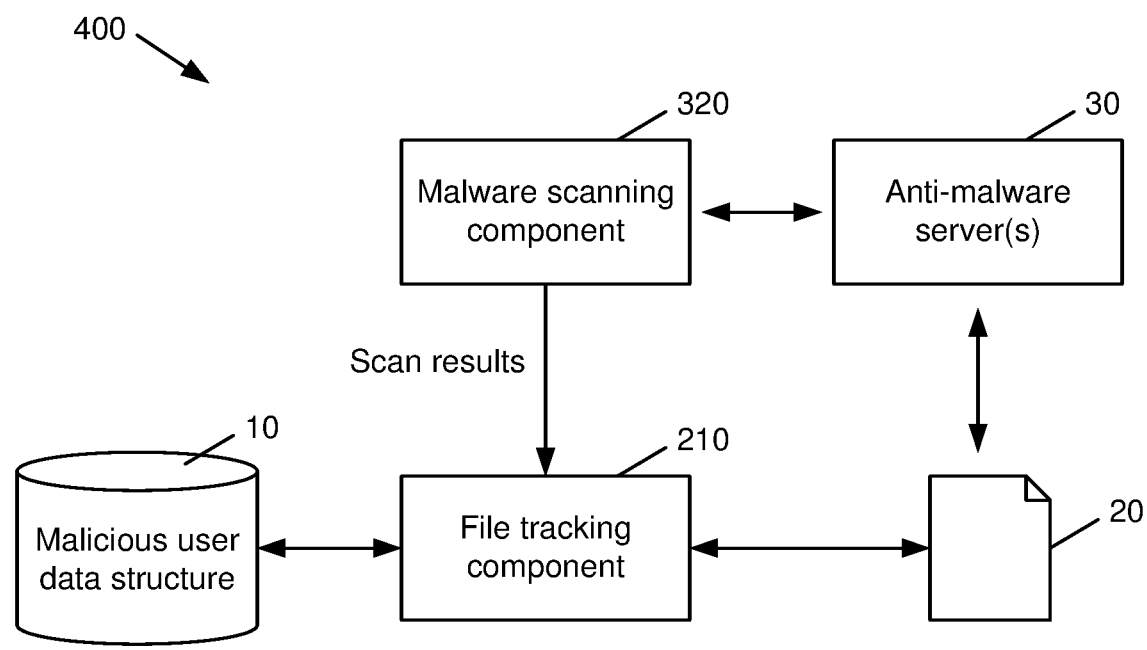
FIG. 4 is a block diagram of a system that facilitates directing a malware scan and managing related scan results in accordance with various aspects described herein.

With reference now to FIG. 4, a block diagram of a system 400 that facilitates directing a malware scan and managing related scan results in accordance with various aspects described herein is illustrated. Repetitive description of like elements employed in other embodiments described herein is omitted for brevity. System 400 as shown in FIG. 4 includes a malware scanning component 320, which can direct malware scans of one or more files 20 as described above with respect to FIG. 3. For instance, the malware scanning component 320 can direct an external anti-malware server 30, such as an antivirus server (AVS) or the like, to scan a given file 20. The anti-malware server 30 can perform a malware scan of the file 20 according to one or more scan configurations. These configurations can include, but are not limited to, the following:

1. Scheduled Scan: Scanning of one or more files is triggered at a predetermined time, e.g., using a job engine associated with the data storage system.

2. Forced Scan: A system administrator can choose to scan a file forcefully at any given time.

3. Real time scan: Real time scanning can be performed via scan on write/close or scan on read/open.

a. Scan on Write/Close: A scan is performed when a user writes a new file or modifies an existing file and closes it.

b. Scan on Read/Open: A scan is performed on a file when a user tries to read or open it.

In response to performing a scan on the file 20 according to one or more of the above techniques, the external anti-malware server 30 can report a result of the scan back to the malware scanning component 320, which in turn can relay the scan result to the file tracking component 210. If the scan performed by the anti-malware server 30 indicates that the file 20 is clean, i.e., does not contain malware, the file tracking component 210 can clear the set of modifying users for the file 20, e.g., as recorded in an owner attribute of the file 20 as described above with respect to FIG. 2. Otherwise, if the scan of the file 20 indicates that the file 20 does contain malware, the file tracking component 210 can record some or all of the modifying users for the file in the malicious user data structure 10 for future reference and/or potential damage control actions.

Figure 5:
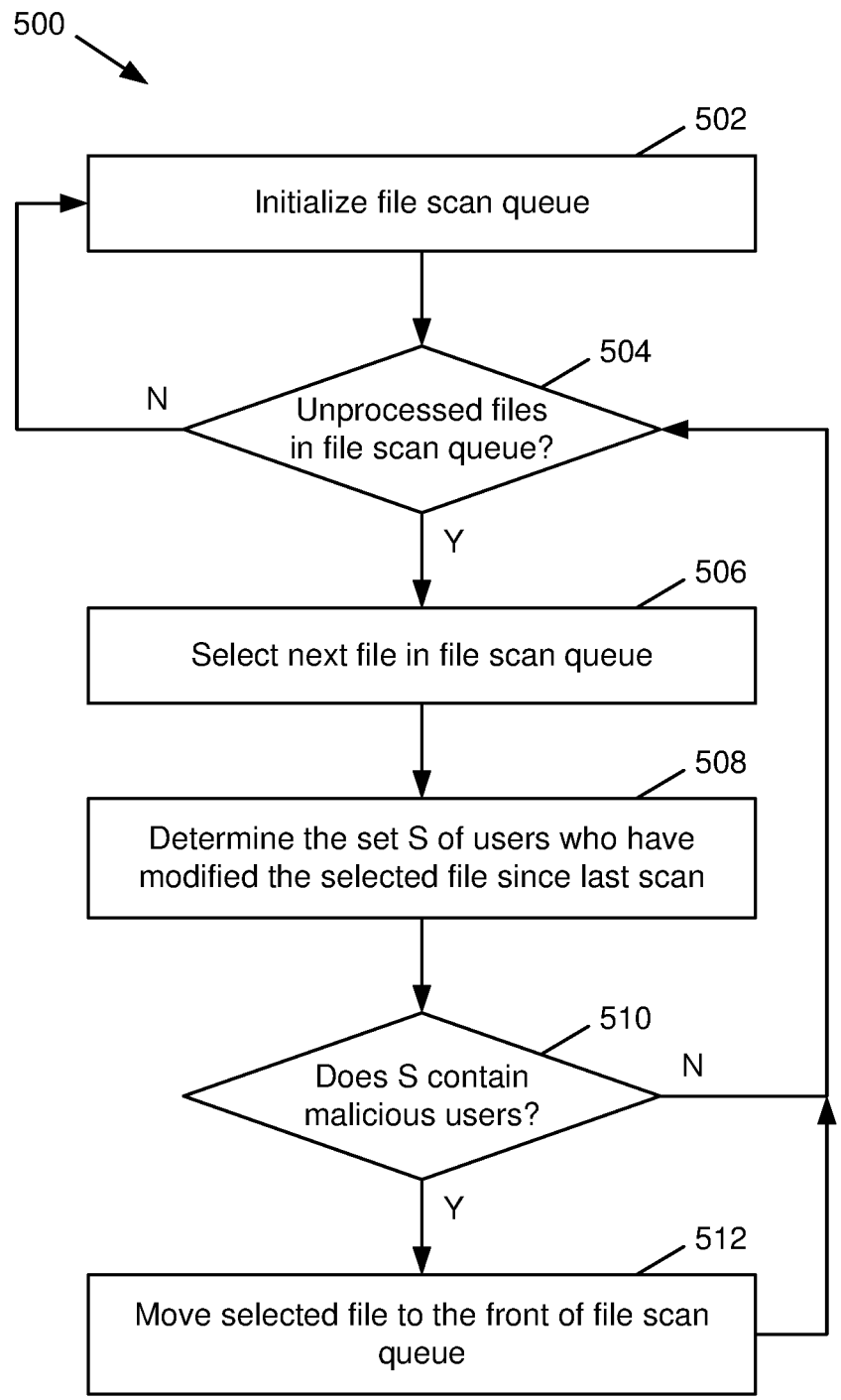
FIG. 5 is a flow diagram of a method that facilitates managing a malware scan queue in accordance with various aspects described herein.

Turning now to FIG. 5, a flow diagram of an example method 500 for managing a malware scan queue, e.g., for a scheduled scan job, in accordance with various aspects described herein is illustrated. In an aspect, the malware scanning component 320 as described above can send a scan request to an external anti-malware server 30 one file at a time. As a result, the files can be queued for scanning in an order determined by the corresponding scan job. Accordingly, method 500 as described below can be used to prioritize and/or otherwise change the scan order of respective files to timely detect possible malware. By prioritizing malware scans of files that have a higher possibility of being infected due to being written or modified by a suspicious user, method 500 can minimize the amount of time a virus or other malware can potentially reside on the data storage system.

Method 500 begins at 502, where a file scan queue, e.g., a malware scan queue generated by the scan queue component 310, can be initialized. Next, at 504, it can be determined whether the scan queue initialized at 502 contains unprocessed files. If the scan queue contains no unprocessed files, e.g., the scan queue is empty, method 500 can return to 502 to process a subsequent scan queue.

If unprocessed files are present in the scan queue, method 500 can continue from 504 to 506, where the next file in the scan queue (e.g., a first unprocessed file in the scan queue) is selected. At 508, the set S of users who have modified the file selected at 506 can be determined (e.g., by a user lookup component 110 based on information recorded in an attribute of the file by the file tracking component 210).

At 510, the set S can be compared to a global set of malicious users (e.g., users present in a malicious user data structure 10). If set S for the file is determined at 510 to contain one or more malicious users, method 500 can proceed to 512, where the file is moved to the front of the file scan queue. After moving the file to the front of the scan queue at 512, or in response to set S for the file not containing malicious users at 510, method 500 can return to 504 to continue processing the files in the scan queue.

Figure 6:
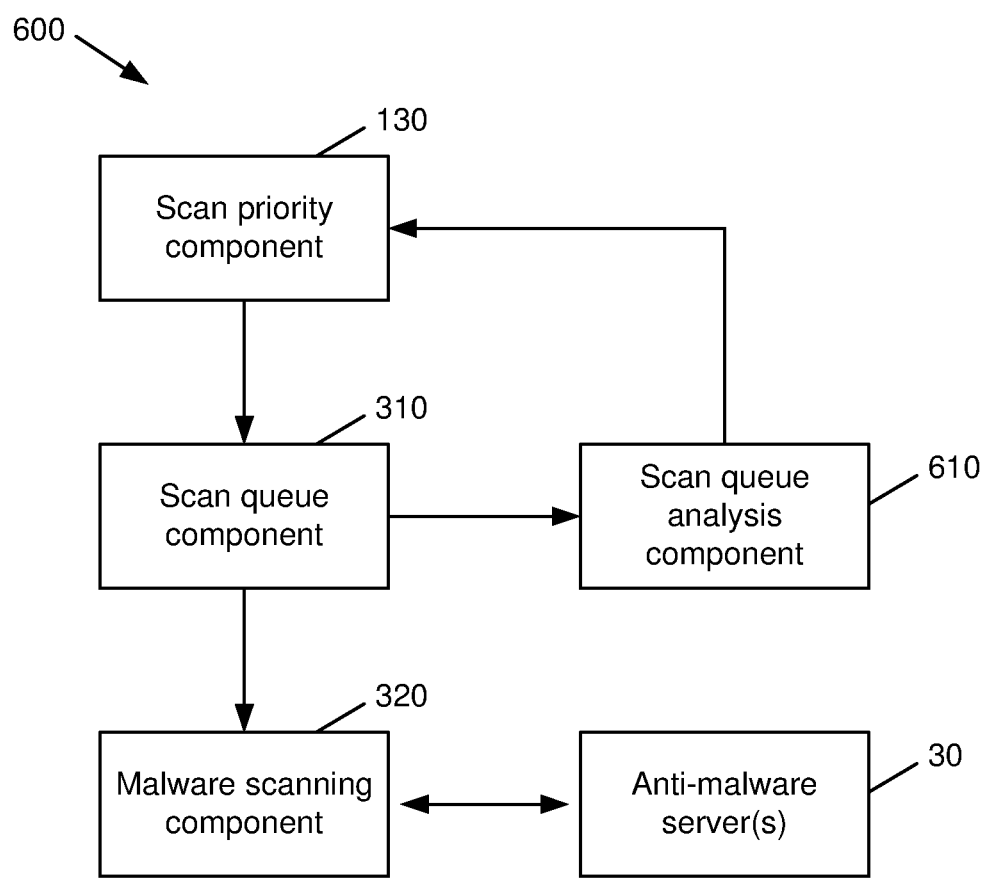
FIG. 6 is a block diagram of a system that facilitates prioritized scanning of files modified by malicious users in a data storage system in accordance with various aspects described herein.

Turning now to FIG. 6, a block diagram of a system that facilitates prioritized scanning of files modified by malicious users in a data storage system in accordance with various aspects described herein is illustrated. Repetitive description of like elements employed in other embodiments described herein is omitted for brevity. System 600 as shown in FIG. 6 includes a scan priority component 130 and a scan queue component 310, which can facilitate the placement of respective files in a scan queue as described above with respect to FIGS. 4-5. System 600 further includes a scan queue analysis component 610 that can further modify the scan priority of respective files as set by the scan priority component 130 and/or the position of respective files in the scan queue as set by the scan queue component 310.

In an aspect, the scan queue analysis component 610 can analyze respective files associated with the scan queue set by the scan queue component 310 to determine whether further adjustments to the scan queue are desirable. For instance, the scan queue analysis component 610 can identify a file in the scan queue that has been modified or written by a particular malicious user and further search the scan queue for other files associated with the malicious user. In response to finding one or more additional files in the scan queue that have been modified by the malicious user, the scan queue analysis component 610 can facilitate prioritized processing of the additional files with the original file. By way of example, the scan priority component 130 can assign the same or similar scan priority to the additional files as that assigned to the original file modified by the malicious user. Similarly, the scan queue component 310 can move the additional files ahead in the scan queue, e.g., to a similar position in the scan queue as the original file.

In another aspect, the scan queue analysis component 610 can also identify unqueued files that have been modified by a given malicious user and facilitate the placement of those files in the scan queue and/or scanning of those files outside of the scan queue, e.g., in a real-time malware scan. This can be done, for instance, to create a customized malware scan queue containing a set of files that have been written by one or more designated suspicious users. Other techniques for assigning and/or modifying file scan priorities by the scan queue analysis component 610 can also be used.

Figure 7:
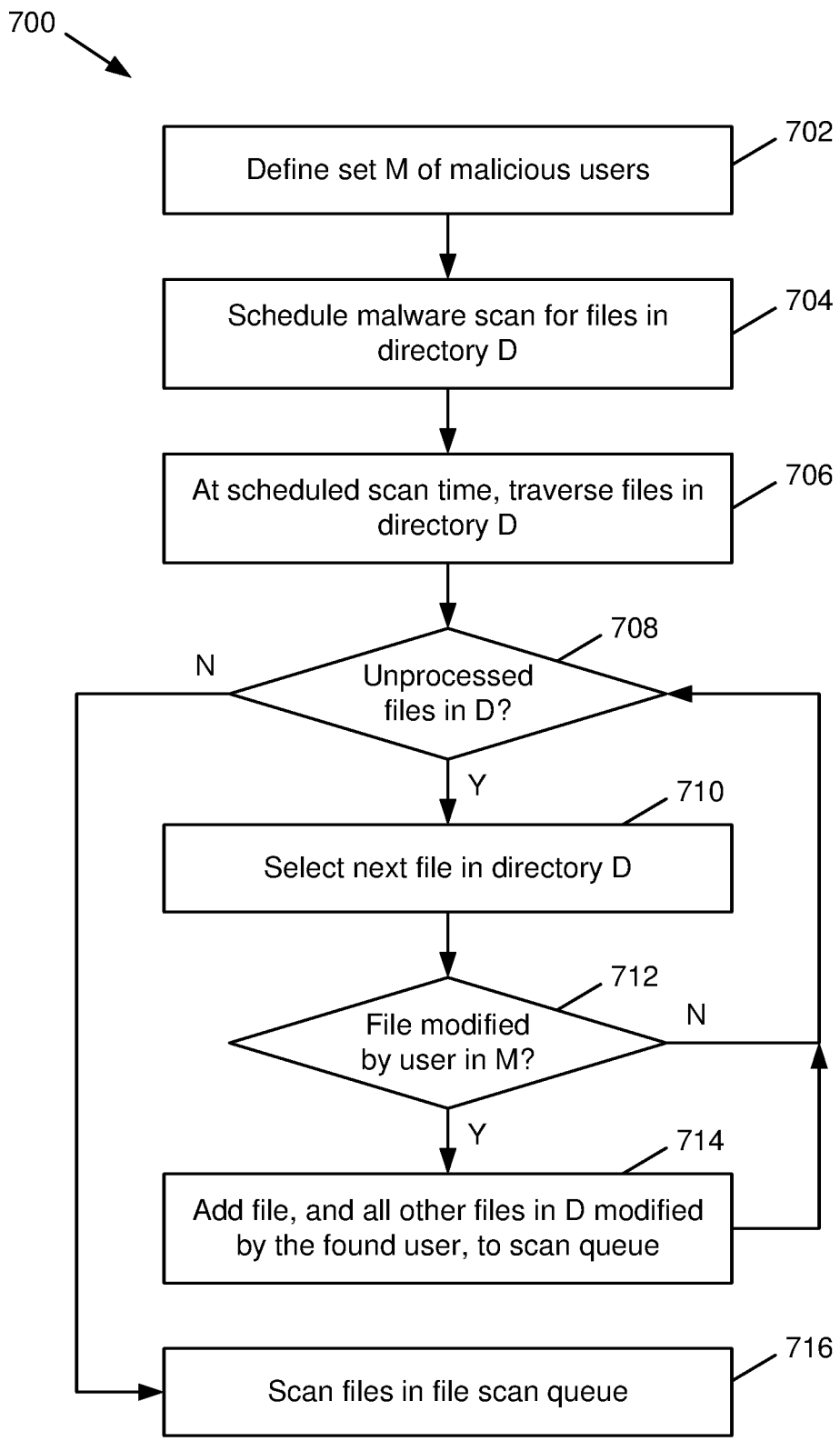
FIGS. 7-8 are flow diagrams of respective methods that facilitate priority scanning of files written by malicious users in a data storage system in accordance with various aspects described herein.

FIG. 7 illustrates a flow diagram of a method 700 that facilitates prioritized scanning of files modified by malicious users in a data storage system in accordance with various aspects described herein. In particular, method 700 can be utilized by the scan priority component 130 and/or the scan queue component 310 to periodically scan files that have been modified by identified malicious users.

At 702, a set M of malicious users can be identified. In an aspect, the set M can contain the user IDs and/or other identifiers of users that have injected malware onto the file storage system in the past. This can be a global set of malicious users, e.g., as given by a malicious user data structure 10, or a custom set, e.g., a set containing one or more users as defined by an administrator.

At 704, a malware scan can be scheduled (e.g., by the malware scanning component 320) for respective files in a directory D. When the scheduled scan time arrives, method 700 can proceed to 706, wherein traversal of the respective files in directory D can be initiated.

Traversal of the directory D can begin as shown at 708, wherein it is determined whether unprocessed files exist in directory D. If at least one unprocessed file exists, method 700 proceeds to 710 to select the next unprocessed file (e.g., by time of last modification, alphabetically by filename, randomly, and/or according to any other ordering). At 712, it is determined whether the file selected at 710 has been modified by at least one user in set M as defined in 702. If the file has been modified by at least one malicious user, method 700 can proceed to 714, wherein the selected file, as well as one or more other files in directory D that have been modified by some or all of the found malicious users in 712, are added to a malware scan queue (e.g., by the scan queue component 310).

Upon adding files to the scan queue at 714, or in response to determining that the file selected at 710 was not modified by any malicious users, method 700 can return to 708 for processing of additional files. Once all files in directory D have been processed, e.g., no unprocessed files remain in directory D, method 700 can proceed from 708 to 716, wherein the files in the scan queue as added at 714 can be scanned (e.g., by an anti-malware server 30 at the direction of the malware scanning component 320).

Figure 8:
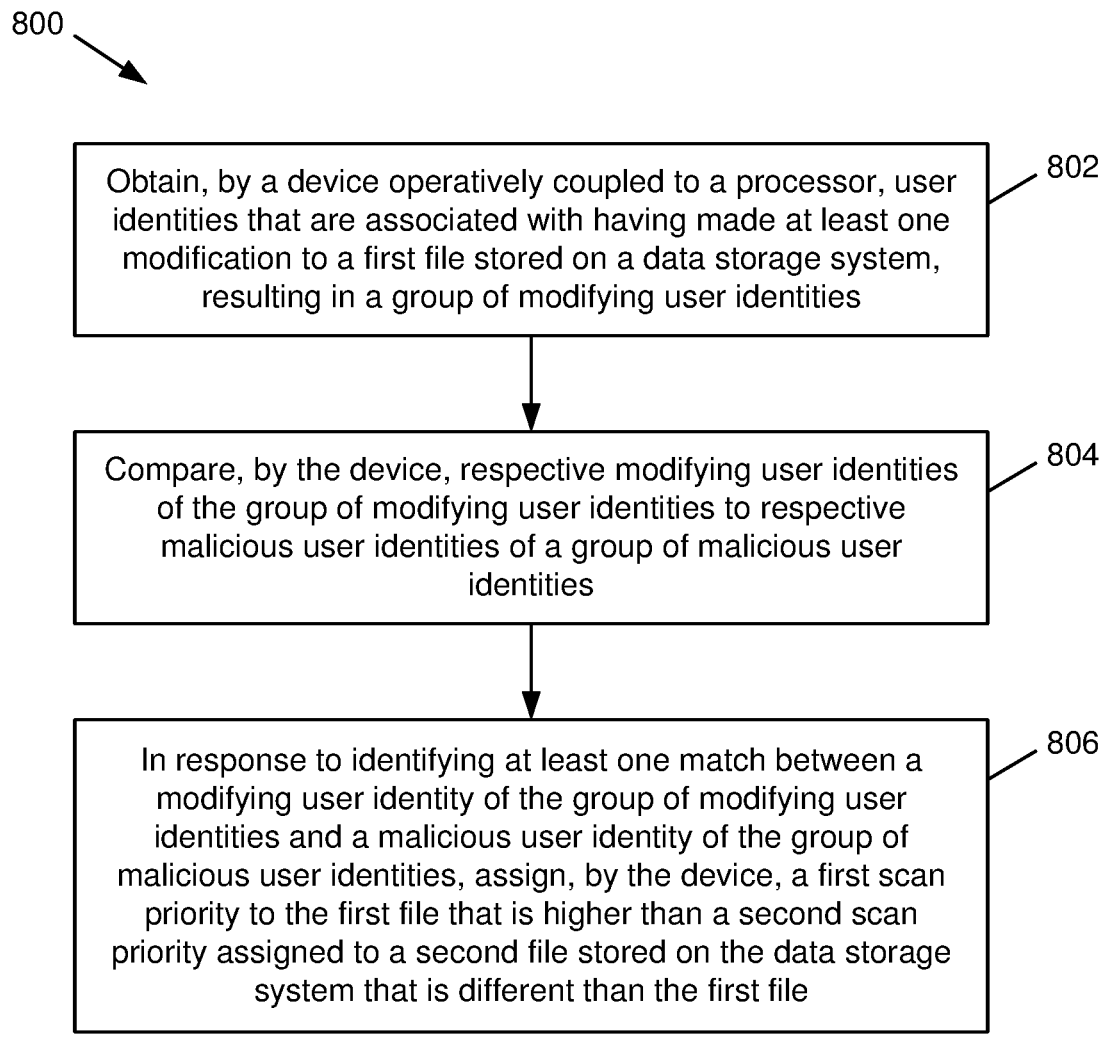

With reference now to FIG. 8, presented is a flow diagram of another method 800 that facilitates prioritized scanning of files modified by malicious users in a data storage system in accordance with various aspects described herein. At 802, a device operatively coupled to a processor can obtain (e.g., by a user lookup component 110) user identities (usernames, numerical identifiers, etc.) that are associated with having made at least one modification to a file stored on a data storage system, resulting in a group of modifying user identities.

At 804, the device can compare (e.g., by a comparison component 120) respective modifying user identities of the group of modifying user identities created at 802 to respective malicious user identities of a group of malicious user identities (e.g., as defined by a malicious user data structure 10 and/or by other means).

At 806, in response to identifying at least one match between a modifying user identity of the group of modifying user identities and a malicious identity of the malicious user identities at 804, the device can assign (e.g., by a scan priority component 130) a first scan priority to the first file processed at 802 that is higher than a second scan priority assigned to a second file stored on the data storage system that is different from the first file.

FIGS. 5, 7, and 8 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 9:
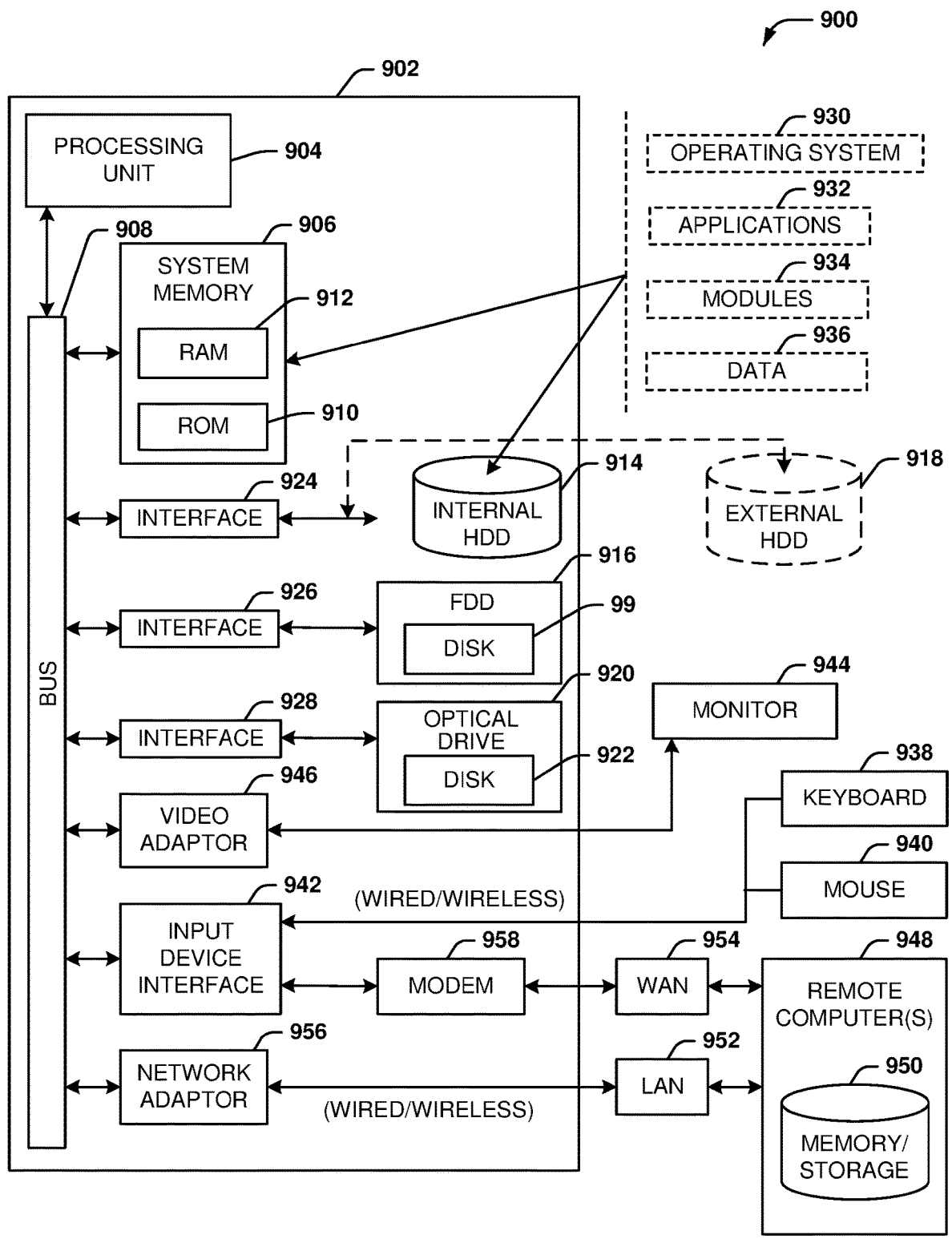
FIG. 9 is a diagram of an example computing environment in which various embodiments described herein can function.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). While the internal HDD 914 is illustrated as located within the computer 902, the internal HDD 914 can also be configured for external use in a suitable chassis (not shown). The HDD 914, magnetic FDD 916 and optical disk drive 920 can be connected to the system bus 908 by an HDD interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a USB port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless access point (AP) disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
 a memory that stores computer executable components; and
 a processor that executes computer executable components stored in the memory, wherein the computer executable components comprise:
  a scan queue component that generates a malware scan queue that comprises a group of files stored on the data storage system, the group of files comprising a first file and a second file that is different from the first file;
  a user lookup component that obtains identities of users that have made at least one modification to the first file, resulting in a set of modifying users;
  a comparison component that compares respective modifying users of the set of modifying users to respective malicious users of a set of malicious users; and
  a scan priority component that, in response to the comparison component identifying at least one match between a modifying user of the set of modifying users and a malicious user of the set of malicious users, assigns a first scan priority to the first file in the malware scan queue that is higher than a second scan priority assigned to the second file in the malware scan queue;
  wherein the scan queue component, in response to the comparison component identifying the at least one match, locates respective unqueued files stored on the data storage system that have been modified by the malicious user, and wherein the scan queue component, in response to locating the respective unqueued files, adds the respective unqueued files to the malware scan queue.

2. The data storage system of claim 1, wherein the computer executable components further comprise:
 a file tracking component that records the set of modifying users as an attribute of the first file, wherein the user lookup component obtains the set of modifying users via the attribute of the first file.

3. The data storage system of claim 2, wherein the file tracking component clears the set of modifying users in response to a malware scan of the first file indicating that the first file does not contain malware.

4. The data storage system of claim 1, wherein the computer executable components further comprise:
 a malware scanning component that directs a first malware scan of the first file and a second malware scan of the second file in an order defined by the malware scan queue.

5. The data storage system of claim 1, wherein the scan queue component moves the first file ahead of the second file in the malware scan queue in response to the comparison component identifying the at least one match.

6. The data storage system of claim 4, wherein the malware scanning component directs the first malware scan of the first file in response to the comparison component identifying the at least one match, and wherein the scan queue component removes the first file from the malware scan queue in response to completion of the first malware scan.

7. The data storage system of claim 4, wherein the computer executable components further comprise:
 a scan queue analysis component that identifies a third file in the malware scan queue that has been modified by the malicious user, wherein the third file is different from the first file and the second file, and wherein the scan priority component assigns the first scan priority to the third file in response to the scan queue analysis component identifying the third file.

8. The data storage system of claim 1, wherein the first scan priority comprises a real-time scan priority and the second scan priority comprises a scheduled scan priority.

9. A method, comprising:
generating, by a device operatively coupled to a processor, a malware scan queue that comprises a group of files stored on a data storage system, the group of files comprising a first file and a second file that is different from the first file;
obtaining, by the device, user identities that are associated with having made at least one modification to the first file, resulting in a group of modifying user identities;
comparing, by the device, respective modifying user identities of the group of modifying user identities to respective malicious user identities of a group of malicious user identities;
in response to identifying at least one match between a modifying user identity of the group of modifying user identities and a malicious user identity of the group of malicious user identities, assigning, by the device, a first scan priority to the first file in the malware scan queue that is higher than a second scan priority assigned to the second file in the malware scan queue;
further in response to identifying the at least one match, locating, by the device, respective unqueued files stored on the data storage system that have been modified by the malicious user identity; and
in response to locating the respective unqueued files, adding, by the device, the respective unqueued files to the malware scan queue.

10. The method of claim 9, further comprising:
recording, by the device, the group of modifying user identities as an attribute of the first file, wherein the obtaining the user identities comprises obtaining the group of modifying user identities via the attribute of the first file.

11. The method of claim 9, further comprising:
directing, by the device, malware scans comprising a first malware scan of the first file and a second malware scan of the second file in an order defined by the malware scan queue.

12. The method of claim 9, wherein the assigning the first scan priority comprises moving the first file ahead of the second file in the malware scan queue.

13. The method of claim 11, wherein the directing the malware scans comprises directing the first malware scan of the first file in response to identifying the at least one match, and wherein the method further comprises:
removing, by the device, the first file from the malware scan queue in response to completion of the first malware scan.

14. The method of claim 11, further comprising:
identifying, by the device, a third file in the malware scan queue that has been modified by the malicious user identity, wherein the third file is different from the first file and the second file, and wherein the assigning the first scan priority comprises assigning the first scan priority to the third file in response to the identifying the third file.

15. The method of claim 9, wherein the first scan priority comprises a real-time scan priority and the second scan priority comprises a scheduled scan priority.

16. A non-transitory machine-readable medium comprising computer executable instructions that, when executed by a processor of a data storage system, facilitate performance of operations, the operations comprising:
generating a malware scan queue that comprises a group of files stored on the data storage system, the group of files comprising a first file and a second file that is distinct from the first file;
obtaining identities of users that have made at least one modification to the first file, resulting in modifying users;
comparing respective modifying users of the modifying users to respective malicious users of malicious users;
in response to identifying at least one match between a modifying user of the modifying users and a malicious user of the malicious users, assigning a first scan priority to the first file in the malware scan queue that is higher than a second scan priority assigned to the second file in the malware scan queue;
further in response to identifying the at least one match, locating respective unqueued files stored on the data storage system that have been modified by the malicious user; and
in response to locating the respective unqueued files, adding the respective unqueued files to the malware scan queue.

17. The non-transitory machine-readable medium of claim 16, wherein the operations further comprise:
directing a first malware scan of the first file and a second malware scan of the second file in an order defined by the malware scan queue.

18. The non-transitory machine-readable medium of claim 16, wherein the operations further comprise:
in response to identifying the at least one match, moving the first file ahead of the second file in the malware scan queue.

19. The non-transitory machine-readable medium of claim 17, wherein the operations further comprise:
directing the first malware scan in response to identifying the at least one match; and
removing the first file from the malware scan queue in response to completion of the first malware scan.

20. The non-transitory machine-readable medium of claim 17, wherein the operations further comprise:
identifying a third file in the malware scan queue that has been modified by the malicious user, wherein the third file is different from the first file and the second file; and
assigning the first scan priority to the third file in response to the identifying the third file.

* * * * *